United States Patent
Katusic et al.

(10) Patent No.: US 7,510,693 B2
(45) Date of Patent: Mar. 31, 2009

(54) PROCESS FOR THE PRODUCTION OF METAL OXIDE POWDERS

(75) Inventors: Stipan Katusic, Kelkheim (DE); Michael Kraemer, Schoeneck-Kilianstaedten (DE); Michael Kroell, Gelnhausen (DE); Peter Kress, Karlstein (DE); Edwin Staab, Geiselbach (DE)

(73) Assignee: Degussa AG, Duesseldorf (DE)

( * ) Notice: Subject to any disclaimer, the term of this patent is extended or adjusted under 35 U.S.C. 154(b) by 76 days.

(21) Appl. No.: 11/341,416

(22) Filed: Jan. 30, 2006

(65) Prior Publication Data

US 2006/0193764 A1     Aug. 31, 2006

(30) Foreign Application Priority Data

Feb. 5, 2005   (DE)   ........... 10 2005 005 344
Jun. 25, 2005  (DE)   ........... 10 2005 029 524

(51) Int. Cl.
| | |
|---|---|
| C01F 17/00 | (2006.01) |
| C01B 13/14 | (2006.01) |
| C01B 13/00 | (2006.01) |
| C01C 1/00 | (2006.01) |
| C01D 1/02 | (2006.01) |
| C01G 57/00 | (2006.01) |
| C01G 49/00 | (2006.01) |
| C01G 25/02 | (2006.01) |
| C01G 41/02 | (2006.01) |
| C01G 9/02 | (2006.01) |
| C01G 11/02 | (2006.01) |
| C01G 13/02 | (2006.01) |
| C01G 17/02 | (2006.01) |
| C01G 19/02 | (2006.01) |
| C01G 21/02 | (2006.01) |
| C01G 45/12 | (2006.01) |
| A46B 11/02 | (2006.01) |
| A46B 5/02 | (2006.01) |
| B05C 17/005 | (2006.01) |

(52) U.S. Cl. .......... 423/263; 401/190; 423/592.1; 423/593.1; 423/594.1; 423/598; 423/599; 423/600; 423/594.9; 423/594.12; 423/594.14

(58) Field of Classification Search ........... 423/263; 401/190; 128/200
See application file for complete search history.

(56) References Cited

U.S. PATENT DOCUMENTS 7,211,236 B2 *   5/2007   Stark et al.   ............ 423/592.1

(Continued)

FOREIGN PATENT DOCUMENTS

EP     1 506 940 A1     2/2005
WO     WO 01/36332 A1 *  5/2001

OTHER PUBLICATIONS

Hirano et al. "Preparation and spherical agglomeration of crystalline cerium(IV) oxide nanoparticles by thermal hydrolysis". J. Am. Ceram. Soc., 83 [5] 1287-89 (2000).*

(Continued)

Primary Examiner—Jerry Lorengo
Assistant Examiner—Jennifer A Smith
(74) Attorney, Agent, or Firm—Oblon, Spivak, McClelland, Maier & Neustadt, P.C.

(57) ABSTRACT

Process for the production of a metal oxide powder having a BET surface area of at least 20 m²/g by reacting an aerosol with oxygen in a reaction space at a reaction temperature of more than 700° C. and then separating the resulting powder from gaseous substances in the reaction space, wherein
  the aerosol is obtained by atomisation using a multi-component nozzle of at least one starting material, as such in liquid form or in solution, and at least one atomising gas,
  the volume-related mean drop diameter $D_{30}$ of the aerosol is from 30 to 100 μm and
  the number of aerosol drops larger than 100 μm is up to 10%, based on the total number of drops,
and metal oxide powder obtainable by this process.

17 Claims, 1 Drawing Sheet

U.S. PATENT DOCUMENTS

| | | | |
|---|---|---|---|
| 7,264,787 B2 * | 9/2007 | Katusic et al. | 423/263 |
| 2006/0034745 A1 * | 2/2006 | Hung et al. | 423/263 |
| 2006/0193764 A1 * | 8/2006 | Katusic et al. | 423/263 |
| 2007/0003779 A1 * | 1/2007 | Katusic et al. | 428/570 |

OTHER PUBLICATIONS

U.S. Appl. No. 11/574,020, filed Feb. 21, 2007, Katusic, et al.
U.S. Appl. No. 11/509,741, filed Aug. 25, 2006, Hill, et al.
U.S. Appl. No. 11/677,068, filed Oct. 29, 2005, Meyer.

* cited by examiner

PROCESS FOR THE PRODUCTION OF METAL OXIDE POWDERS

BACKGROUND OF THE INVENTION

1. Field of the Invention

The invention relates to a process for the production of metal oxide powders by spray pyrolysis. The invention relates further to a metal oxide powder obtainable by this process, and to the use thereof.

2. Description of the Background

It is known from EP-A-1142830 to obtain metal oxide powders by burning an aerosol composed of organic precursors dissolved in organic solvents. The aerosol can have a mean drop size of from <1 to 500 µm. A metal oxide powder so produced has a BET surface area of from 1 to 600 m$^2$/g. A disadvantage, however, is that the metal oxide powders often have a wide primary particle size distribution. Furthermore, the examples given, in which only small amounts of product are obtained, cannot be transferred to larger amounts.

WO2004/005184A1 claims a process for the production of metal oxides in which droplets are produced from a solution and are oxidised in a flame. The solution contains at least one starting material and at least 60%, based on the solution as a whole, of a carboxylic acid as solvent. The mean droplet size is from 0.1 to 100 µm, preference being given to smaller droplets. The process has the disadvantage that it is not suitable for the production of relatively large amounts.

A process for the production of cerium oxide is known from WO01/36332A1. This process claims the burning of an aerosol of a cerium oxide precursor in a high-temperature zone of from 700 to 1100° K, wherein the drop size of the aerosol must be smaller than 100 µm. There is nothing in the description of the application relating to the effect of the drop size, nor are values for the droplet size mentioned in the examples. In addition, this process yields inhomogeneous cerium oxide particles of different sizes.

SUMMARY OF THE INVENTION

The object of the invention is to provide a process for the production of metal oxide powders by means of which a homogeneous powder having a high BET surface area and a narrow particle size distribution can be obtained and which is suitable for the production of amounts in the kg/h range.

The invention provides a process for the production of a metal oxide powder having a BET surface area of at least 20 m$^2$/g by reacting an aerosol with oxygen in a reaction space at a reaction temperature of more than 700° C. and then separating the resulting powder from gaseous substances in the reaction space, wherein the aerosol is obtained by atomisation using a multi-component nozzle of at least one starting material, as such in liquid form or in solution, and at least one atomising gas, the volume-related mean drop diameter $D_{30}$ of the aerosol is from 30 to 100 µm and the number of aerosol drops larger than 100 µm is up to 10%, based on the total number of drops.

The invention also provides metal oxide powder obtainable by this process. Metal oxide powders within the scope of the invention also include mixed metal oxide powders and doped metal oxide powders.

DETAILED DESCRIPTION OF THE INVENTION

Figure 1:
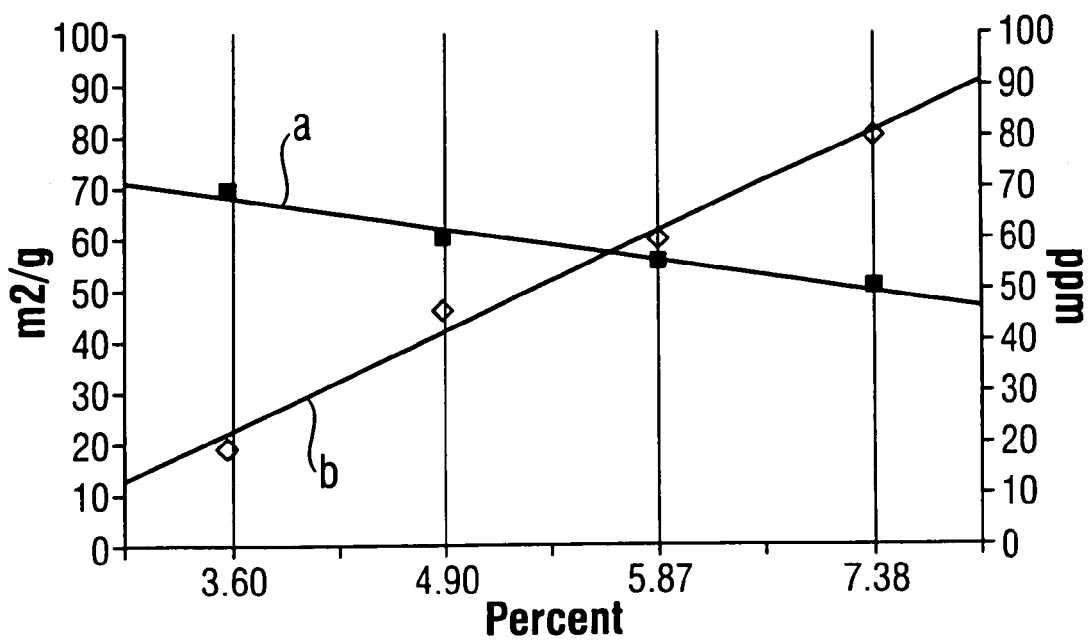
FIG. 1 is a graph of the dependence of the BET surface area (a) in m$^2$/g and of the particles >45 µm (b) on the percentage of drops >100 µm.

A mixed metal oxide powder is to be understood as being a powder in which intimate mixing of mixed oxide components at primary particle or aggregate level is to be understood. The primary particles may exhibit oxygen-bridged metal components in the form of $M_1$-O-$M_2$ bonds. In addition, regions of individual oxides $M_1O$, $M_2O$, $M_3O$, . . . may be present in the primary particles.

A doped metal oxide powder is to be understood as being a powder in which the doping component is located predominantly or exclusively on one lattice site of the metal oxide lattice. The doping component may be in metal or oxide form. An example of a doped metal oxide powder is indium-tin oxide, where tin atoms occupy sites in the lattice of the indium oxide.

The volume-related mean drop diameter $D_{30}$ is calculated by:

$$D_{30} = \sqrt[3]{\frac{1}{N}\sum_{i=1}^{N} D_i^3}$$

A starting material is to be understood as being a metal compound which is converted under the reaction conditions into a metal oxide. In the case of doped metal oxides it may be possible for the starting material of the doping component to be converted into a metal component.

It has been found with the present process according to the invention that it is possible to produce metal oxide powders having a large surface area if the volume-related mean drop diameter $D_{30}$ is from 30 to 100 µm and at the same time up to 10% of the drops are larger than 100 µm. It is possible as a result to increase the throughput of solution compared with the prior art without having to accept a marked reduction in the BET surface areas of the powders. The BET surface area of the powders obtained by the process according to the invention is at least 20 m$^2$/g, preferably from 20 to 200 m$^2$/g.

The absolute drop size is determined according to the principle of dual phase-Doppler anemometry using a 5W argon-ion continuous-wave laser.

In a preferred embodiment, the number of drops, based on the total number of drops, larger than 100 µm may be from 3% to 8%.

Furthermore, it may be advantageous if the percentage of drops larger than 250 µm is not more than 10%, based on the number of drops >100 µm.

In particular, an embodiment may be advantageous in which the following dependence of the volume-related mean drop diameter $D_{30}$ on the spray width of the aerosol applies:

| Spray width [mm] | $D_{30}$ [µm] |
|---|---|
| 0 | 10 to 30 |
| ±20 | 20 to 40 |
| ±40 | 30 to 60 |
| ±60 | 50 to 80 |
| ±80 | 80 to 120. |

The throughput of a solution containing a starting material may be preferably from 1.5 to 2000 kg/h and particularly preferably from 100 to 500 kg/h.

The content of starting material in the solution may be from 2 to 60 wt. %, preferably from 5 to 40 wt. %.

The metal component of the starting material may preferably be Al, Ce, Fe, Mg, In, Ti, Si, Sn, Y, Zn and/or Zr. Within the scope of this invention, silicon dioxide is to be regarded as a metal oxide. Preferred starting materials contain Al, Ce or Zn.

If starting materials containing different metal components are used, mixed metal oxide powders are obtained. The proportion of a particular starting material and accordingly the proportion of the corresponding metal oxide component in the mixed metal oxide powder is not limited.

The starting materials may be organometallic and/or inorganic in nature; preferred are organometallic compounds. Examples of inorganic starting materials may be in particular metal chlorides and metal nitrates. There may be used as organometallic compounds especially metal alcoholates and/or metal carboxylates. There may be used as alcoholates preferably ethoxides, n-propoxides, isopropoxides, n-butoxides and/or tert.-butoxides. As carboxylates there may be used the compounds underlying acetic acid, propionic acid, butanoic acid, hexanoic acid, oxalic acid, malonic acid, succinic acid, glutaric acid, adipic acid, octanoic acid, 2-ethylhexanoic acid, valeric acid, capric acid and/or lauric acid. 2-Ethylhexanoates and/or laurates may particularly advantageously be used.

Inorganic starting compounds may preferably be dissolved in water; organometallic starting compounds may preferably be dissolved in organic solvents.

As organic solvents, or as a constituent of organic solvent mixtures, there may be used preferably alcohols such as methanol, ethanol, n-propanol, isopropanol, n-butanol or tert-butanol, diols such as ethanediol, pentanediol, 2-methyl-2,4-pentanediol, dialkyl ethers such as diethyl ether, tert.-butyl methyl ether or tetrahydrofuran, $C_1$-$C_{12}$-carboxylic acids such as, for example, acetic acid, propionic acid, butanoic acid, hexanoic acid, oxalic acid, malonic acid, succinic acid, glutaric acid, adipic acid, octanoic acid, 2-ethylhexanoic acid, valeric acid, capric acid, lauric acid. There may further be used ethyl acetate, benzene, toluene, naphtha and/or benzine. Preferred are solutions containing $C_2$-$C_{12}$-carboxylic acids, in particular 2-ethylhexanoic acid and/or lauric acid.

Preferably, the content of $C_2$-$C_{12}$-carboxylic acids in the solution is less than 60 wt. %, particularly preferably less than 40 wt. %, based on the total amount of solution.

In a particularly preferred embodiment, the solutions of the starting materials contain at the same time a carboxylate and the underlying carboxylic acid and/or an alcoholate and the underlying alcohol. In particular, there may be used as starting materials 2-ethylhexanoates in a solvent mixture that contains 2-ethylhexanoic acid.

There may be used as the atomising gas in the process according to the invention a reactive gas such as air, air enriched with oxygen and/or an inert gas such as nitrogen. In general, air is used as the atomising gas.

With regard to the amount of atomising gas, the ratio throughput of the solution of the starting material/amount of atomising gas in the process according to the invention is preferably from 2 to 25 kg/Nm$^3$ and particularly preferably from 5 to 10 kg/Nm$^3$.

Suitable multi-component nozzles for the process according to the invention are especially three-component nozzles or four-component nozzles.

When three-component nozzles or four-component nozzles are used it is possible to atomise, in addition to the atomising gas, two, or three, separate solutions which contain the same or different starting materials, in the same or different solvents, in the same or different concentrations.

It is thus possible, for example, simultaneously to atomise two solutions having different concentrations of a starting material with the same solvent or solvent mixture. Aerosol drops of different sizes are thereby obtained.

It is also possible, for example, for the atomising gas to be supplied via two nozzles or for different atomising gases to be used, for example air and steam.

Separate solutions of different starting materials can be used to produce mixed oxide powders.

The reaction temperature of more than 700° C. that is necessary in the process according to the invention can preferably be obtained by means of a flame produced by reaction of a hydrogen-containing combustion gas with (primary) air, optionally enriched with oxygen. Suitable combustion gases may be hydrogen, methane, ethane, propane, butane and/or natural gas, with hydrogen being particularly preferred. The reaction temperature is defined as the temperature that is established 0.5 m below the flame.

It may further be advantageous if secondary air is additionally introduced into the reaction space. In general, the amount of secondary air will be such that the ratio of secondary air to primary air is from 0.1 to 10.

It is particularly advantageous if lambda is $\geq 1.5$, lambda being calculated from the quotient of the sum of the oxygen content in the air used (primary air, secondary air and atomising air) divided by the sum of the starting materials and the hydrogen-containing combustion gas, in each case in mol/h. Very particularly preferably, 2<lambda<5.

Separation of the powder from the reaction mixture is generally preceded by a cooling process. This process may be carried out directly, for example by means of a quenching gas, or indirectly, for example via external cooling.

The invention further provides a metal oxide powder obtainable by the process according to the invention. The metal oxide powder may contain impurities resulting from the starting material and/or the process. The purity of the annealed metal oxide powder is at least 98 wt. %, generally at least 99 wt. %. A content of at least 99.8 wt. % may be particularly preferred.

In general, the metal oxide powder is predominantly or exclusively in the form of aggregates of primary particles, the aggregates exhibiting no cenospherical structures. A cenospherical structure within the scope of the invention is to be understood as being a structure that has a size of from 0.1 to 20 µm and is approximately in the form of a hollow sphere, with a wall thickness of from 0.1 to 2 µm. Predominantly is to be understood as meaning that a TEM picture shows individual non-aggregated particles in an amount of not more than 10%.

The metal oxide powder may preferably have a BET surface area of from 30 to 200 m$^2$/g.

The content of coarse particles >45 µm in the metal oxide powder according to the invention is preferably less than 100 ppm and particularly preferably less than 50 ppm.

The metal oxide powder according to the invention preferably has a carbon content of less than 0.15 wt. % and a content of chloride, sodium and potassium of less than 300 ppm.

The metal oxide powder according to the invention may preferably be a cerium oxide powder having a BET surface area of from 30 to 90 m$^2$/g.

The metal oxide powder according to the invention may further be a cerium oxide powder whose isoelectric point is at a pH value of from 9 to 11.

The cerium oxide powder according to the invention, when exposed to air and temperatures of 900° C. for a period of two hours, may have a BET surface area of up to 35 m$^2$/g.

The mean primary particle diameter of the cerium oxide powder may be preferably from 5 to 20 nm and particularly preferably from 8 to 14 nm.

The mean aggregate diameter of the cerium oxide powder may be from 20 to 100 nm and particularly preferably from 30 to 70 nm.

The invention relates further to the use of the metal oxide powder according to the invention in the preparation of dispersions, in the polishing of glass and metal surfaces, as a catalyst and as a catalyst support.

Having generally described this invention, a further understanding can be obtained by reference to certain specific examples which are provided herein for purposes of illustration only and are not intended to be limiting unless otherwise specified.

EXAMPLES

The specific surface area is determined in accordance with DIN 66131.

The TEM pictures are obtained using a Hitachi TEM device, type H-75000-2. By means of the CCD camera of the TEM device and subsequent image analysis, in each case about 2000 aggregates are evaluated in respect of the primary particle and aggregate diameter. For this purpose, the powders are dissolved in isopropanol/water (1 min, ultrasonic processor UP 100H, Dr. Hielscher GmbH, 100 W).

The content of particles larger than 45 µm is determined in accordance with DIN EN ISO 787, Part 18.

The zeta potential is determined in the pH range 3-12 by means of the electrokinetic sonic amplitude (ESA). For this purpose, a suspension comprising 1% cerium oxide is prepared. Dispersion is effected using an ultrasonic rod (400 W). The suspension is stirred with a magnetic stirrer and pumped via a peristaltic pump through the PPL-80 sensor of the ESA-8000 device from Matec. From the starting pH value, the potentiometric titration starts with 5 m NaOH to pH 12. Back-titration to pH 4 is carried out with 5 m HNO$_3$. Evaluation is carried out by means of the device software Version pcava 5.94.

$$\zeta = \frac{ESA \cdot \eta}{\phi \cdot \Delta\rho \cdot c \cdot |G(\alpha)| \cdot \varepsilon \cdot \varepsilon_r}$$

where ζ zeta potential
ϕ volume fraction
Δρ difference in density between particles and liquid
c sound velocity in the suspension
η viscosity of the liquid
ε dielectric constant of the suspension
|G(α)| inertia correction)

The mean particle radius is determined by means of dynamic light scattering (Horiba LB 500).

Starting Materials

Solution A: 42 wt. % cerium (III) ethylhexanoate, 25 wt. % 2-ethylhexanoic acid, 4 wt. % 2-methyl-2,4-pentanediol, naphtha 29 wt. %.

Solution B: 30 wt. % cerium (III) acetate hydrate, 50 wt. % acetic acid, 20 wt. % lauric acid.

Solution C: 24.4 wt. % zirconium (III) ethylhexanoate, 0.30 wt. % hafnium (III) ethylhexanoate, 39.6 wt. % 2-ethylhexanoic acid, 3.5 wt. % 2-(2-butoxyethoxy)ethanol, 32.2 wt. % white spirit.

EXAMPLE 1

An aerosol is produced by means of a three-component nozzle (Schlick, model 0/4 S41) from the partial streams I: 200 kg/h of solution A, II: 50 kg/h of solution A and III: 17.3 Nm$^3$/h of atomising air and is atomised into a reaction space. In the reaction space there burns an oxyhydrogen flame of hydrogen (40 Nm$^3$/h) and primary air (1806 Nm$^3$/h), in which the aerosol is reacted. Secondary air (3200 Nm$^3$/h) is additionally introduced into the reaction space. After cooling, the cerium oxide powder is separated from gaseous substances on a filter. The residence time of the reaction mixture in the reaction space is 0.9 s. The temperature 0.5 m below the flame is 1100° C.

Examples 2 to 4 are carried out analogously to Example 1. Partial streams I and II remain the same, while partial stream III, the throughput and the pressure are increased.

Example 5 is carried out analogously to Example 1, but solution B is used for partial stream II instead of solution A.

Example 6 is carried out analogously to Example 1, solution C being used instead of solution A.

Example 7 is carried out analogously to Example 1, partial stream I consisting of solution A and partial stream II consisting of solution C.

Table 1 shows the parameters important for the production of the aerosol.

Table 2 shows the parameters important for the flame.

Table 3 shows the analytical values of the resulting powders.

Table 4 shows the drop distribution in percent of all drops >100 µm of Examples 1 to 4.

FIG. 1 shows the dependence of the BET surface area (a) in m$^2$/g and of the particles >45 µm (b) on the percentage of drops >100 µm. FIG. 1 shows the relevance of the proportion of drops >100 µm for the BET surface area and the content of coarse particles >45 µm. The process according to the invention permits the production of large amounts of metal oxide powder having a high BET surface area and a low content of coarse particles, it being possible for the BET surface area and the content of coarse particles to be adjusted by means of the proportion of drops >100 µm.

Figure 2:
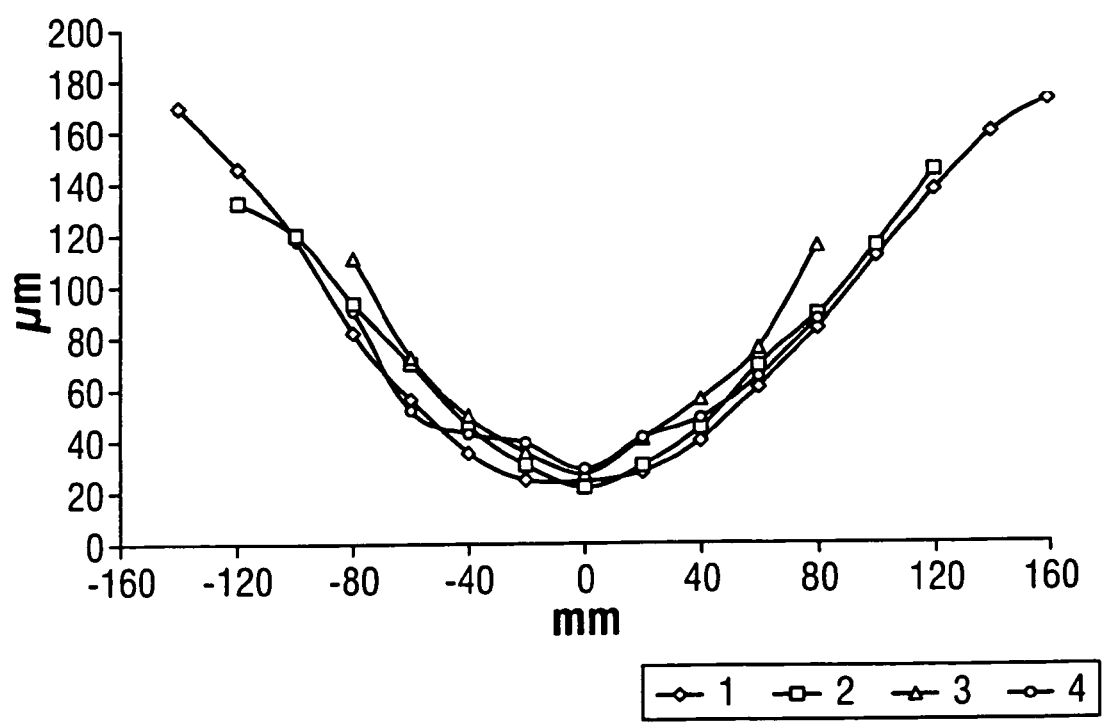
FIG. 2 is a graph of the dependence of $D_{30}$ drop diameter [µm] on the spray width [mm] of the powders from Examples 1 to 4.

FIG. 2 shows the D$_{30}$ drop diameter [µm] of the powders from Examples 1 to 4 in µm in dependence on the spray width [mm]. D$_{30}$ values at the edges of up to 180 µm are obtained thereby. Nevertheless, it is possible with the process according to the invention to produce finely divided metal oxide powders.

The cerium oxide powders of Examples 1 to 5 surprisingly exhibit an isoelectric point at pH values of from 9 to 11. Surprisingly, the isoelectric point of cerium oxide is at 6.5 to 7.5. The higher isoelectric point in the case of the cerium oxide powder according to the invention permits the production of more stable dispersions at pH values of from 7 to 8.5. Such dispersions are suitable in particular for the polishing of SiO$_2$ surfaces.

TABLE 1

Aerosol production

| | Example | | | | | | |
|---|---|---|---|---|---|---|---|
| | 1 | 2 | 3 | 4 | 5 | 6 | 7 |
| Partial stream I | | | | | | | |
| Solution | A | A | A | A | A | C | A |
| Flow [kg/h] | 50.0 | 50.0 | 50.0 | 50.0 | 50.0 | 50.0 | 70 |
| Partial stream II | | | | | | | |
| Solution | A | A | A | A | B | C | C |
| Flow [kg/h] | 200.0 | 200.0 | 200.0 | 200.0 | 200.0 | 200.0 | 170 |
| Partial stream III | | | | | | | |
| Atomising air [Nm³/h] | 17.3 | 28.0 | 35.8 | 42.9 | 17.3 | 17.3 | 17.3 |
| Pressure [bar excess] | | | | | | | |
| Partial stream I | 0.4 | 0.4 | 0.4 | 0.4 | 0.4 | 0.4 | 0.4 |
| Partial stream II | 4.3 | 4.3 | 4.3 | 4.3 | 4.3 | 4.3 | 4.3 |
| Partial stream III | 0.5 | 1.0 | 1.5 | 2.0 | 0.5 | 0.5 | 0.5 |
| Drops | | | | | | | |
| Total number | 598864 | 539612 | 414543 | 381120 | 598812 | 598235 | 539009 |
| Diameter | | | | | | | |
| <100 μm | 92.62 | 94.13 | 95.10 | 98.94 | 92.81 | 92.15 | 91.60 |
| >100 μm | 7.38 | 5.87 | 4.90 | 3.60 | 7.29 | 7.85 | 8.40 |

TABLE 2

Flame parameters

| | Example | | | | | | |
|---|---|---|---|---|---|---|---|
| | 1 | 2 | 3 | 4 | 5 | 6 | 7 |
| Hydrogen [Nm³/h] | 40 | 40 | 40 | 40 | 40 | 40 | 45 |
| Primary air [Nm³/h] | 1800 | 1800 | 1800 | 1800 | 1800 | 1800 | 1800 |
| Secondary air [Nm³/h] | 3200 | 3200 | 3200 | 3200 | 3200 | 3200 | 3300 |
| Atomising air [Nm³/h] | 17.3 | 28.0 | 35.8 | 42.9 | 17.3 | 17.3 | 17.3 |
| lambda | 2.63 | 2.64 | 2.64 | 2.64 | 2.63 | 2.63 | 2.65 |
| Residence time [s] | 0.90 | 0.90 | 1.12 | 1.12 | 0.90 | 0.90 | 0.85 |
| Temperature[a] [° C.] | 1100 | 1020 | 1050 | 1050 | 1100 | 1100 | 1130 |

[a] Temperature = 0.5 m below the flame

TABLE 3

Analytical values of the resulting powders

| | Example | | | | | | |
|---|---|---|---|---|---|---|---|
| | 1 | 2 | 3 | 4 | 5 | 6 | 7 |
| BET surface area [m²/g] | 50 | 55 | 60 | 69 | 42 | 45 | 70 |
| Components >45 μm [ppm] | 60 | 80 | 46 | 20 | 82 | 90 | 38 |
| C content [wt. %] | 0.08 | 0.08 | 0.08 | 0.09 | 0.11 | 0.13 | 0.07 |
| Cl content [a] [ppm] | 225 | 251 | 161 | 242 | 261 | 184 | 192 |
| Na content [a] [ppm] | 176 | 201 | 160 | 189 | 212 | 161 | 180 |
| K content [a] [ppm] | 112 | 156 | 145 | 126 | 154 | 128 | 167 |
| mean primary particle diameter [b] [nm] | 9.3 | 11.3 | 9.0 | 8.5 | — | 13.0 | 9.6 |
| mean aggregate diameter [b] [nm] | 47.5 | 48.5 | 47.3 | 47.0 | — | 66.0 | 47.1 |
| mean aggregate surface area [b] [nm²] | 2410 | 2738 | 2312 | 2280 | — | 5228 | 4288 |

[a] according to ICP measurement;
[b] determined by means of image analysis;

TABLE 4

| Drop distribution in % of all drops >100 μm | Example | | | |
|---|---|---|---|---|
| | 1 | 2 | 3 | 4 |
| 100-150 μm | 7.14 | 11.17 | 18.00 | 25.39 |
| 151-200 μm | 42.09 | 48.67 | 56.42 | 37.23 |
| 201-250 μm | 45.64 | 33.25 | 23.33 | 33.34 |
| >250 μm | 5.13 | 6.91 | 2.25 | 4.04 |

Every description in this specification of a numerical range is intended to inherently include a description of all possible values and subranges within the range.

The disclosures in DE 10 2005 005 344.0, filed Feb. 5, 2005, and DE 10 2005 029 542.8, filed Jun. 25, 2005, are hereby incorporated by reference.

The invention claimed is:

1. Process for the production of a metal oxide powder having a BET surface area of at least 20 $m^2/g$ comprising reacting an aerosol with oxygen in a reaction space at a reaction temperature of more than 700° C. and then separating the resulting powder from gaseous substances in the reaction space, wherein the aerosol is obtained by atomising using a three-component nozzle or four-component nozzle at least one starting material, either as such in liquid form or in solution, and at least one atomising gas, the volume-related mean drop diameter $D_{30}$ of the aerosol is from 30 to 100 μm, the number of aerosol drops larger than 100 μm is up to 10%, based on the total number of drops, and two or three separate solutions which contain the same or different starting materials, in the same or different solvents, in the same or different concentrations are atomised with the three-component nozzle or four-component nozzle, in addition to the atomising gas.

2. Process according to claim 1, wherein the number of aerosol drops, based on the total number of drops, larger than 100 μm is from 3% to 8%.

3. Process according to claim 1, wherein the percentage of aerosol drops larger than 250 μm is not more than 10%, based on the number of drops >100 μm.

4. Process according to claim 1, wherein the following applies for the volume-related mean drop diameter $D_{30}$ [μm] in dependence on the spray width [mm] of the aerosol:

| Spray width | $D_{30}$ |
|---|---|
| 0 | 10 to 30 |
| ±20 | 20 to 40 |
| ±40 | 30 to 60 |
| ±60 | 50 to 80 |
| ±80 | 80 to 120. |

5. Process according to claim 1, wherein the at least one starting material is in solution and the throughput of the solution is from 1.5 to 2000 kg/h.

6. Process according to claim 1, wherein the at least one starting material is in solution and has a metal content in the solution of from 2 to 40 wt. %.

7. Process according claim 1, wherein the at least one starting material comprises as the metal component at least one metal selected from the group consisting of Al, Ce, Fe, Mg, In, Ti, Si, Sn, Y, Zn and Zr.

8. Process according to claim 1, wherein the at least one starting material comprises an organometallic compound.

9. Process according to claim 1, wherein the at least one starting material is dissolved in an organic solvent to form said solution.

10. Process according to claim 9, wherein the organic solvent is at least one carboxylic acid having from 2 to 12 carbon atoms.

11. Process according to claim 10, wherein the content of said at least one carboxylic acid is less than 60 wt. %.

12. Process according to claim 1, wherein the atomising gas is air.

13. Process according to claim 1, wherein the starting material is in solution, and the ratio throughput of the solution/amount of atomising gas is from 2 to 25 $kg/Nm^3$.

14. Process according to claim 1, wherein the reaction temperature is obtained by a flame produced by reaction of a hydrogen-containing combustion gas with oxygen and/or air.

15. Process according to claim 14, wherein secondary air is additionally introduced into the reaction space.

16. Process according to claim 14, wherein lambda is ≧1.5, lambda being calculated from the quotient of the sum of the oxygen content of the air and, optionally, of the atomising gas and the sum of the starting materials and the hydrogen-containing combustion gas, in each case in mol/h.

17. Process according claim I, wherein the metal oxide powder comprises Ce oxide exhibiting an isoelectric point at pH values from 9 to 11.

* * * * *